United States Patent [19]

Dietrich et al.

[11] Patent Number: 4,807,980
[45] Date of Patent: Feb. 28, 1989

[54] UNIVERSAL CONDENSER HAVING ONLY A SINGLE TURRET FOR A MICROSCOPE

[75] Inventors: Peter Dietrich, Oberkochen; Hanns J. Bendele, Heidenheim, both of Fed. Rep. of Germany

[73] Assignee: Carl-Zeiss-Stiftung, Heidenheim, Fed. Rep. of Germany

[21] Appl. No.: 142,524

[22] Filed: Jan. 11, 1988

[30] Foreign Application Priority Data

Jan. 15, 1987 [DE] Fed. Rep. of Germany ....... 3700965

[51] Int. Cl.⁴ .................... G02B 21/14; G02B 21/06
[52] U.S. Cl. .................................... 350/526; 350/528
[58] Field of Search ............. 350/526, 528, 523, 524, 350/254

[56] References Cited

U.S. PATENT DOCUMENTS 3,799,645 3/1974 Stankewicz .................... 350/526
3,833,283 9/1974 Stankewicz .................... 350/526
3,930,712 1/1976 Boughton et al. .............. 350/526
4,136,927 1/1979 Lisfield ........................... 350/526
4,363,532 12/1982 Weber ............................ 350/523
4,521,076 6/1985 Weber et al. ................... 350/254

FOREIGN PATENT DOCUMENTS 2946927 5/1981 Fed. Rep. of Germany ...... 350/526
1423691 2/1976 United Kingdom .

Primary Examiner—Jon W. Henry
Attorney, Agent, or Firm—Walter Ottesen

[57] ABSTRACT

The invention is directed to a condenser having a flip out front lens and an auxiliary lens which can be switched in position for illuminating larger object fields. The auxiliary lens is mounted on a single turret disc of the condenser together with an aperture-iris diaphragm and is switched into position in the illuminating beam path alternately with the aperture-iris diaphragm.

6 Claims, 1 Drawing Sheet

UNIVERSAL CONDENSER HAVING ONLY A SINGLE TURRET FOR A MICROSCOPE

FIELD OF THE INVENTION

The invention relates to a universal condenser for a microscoped. The universal condenser includes a controllable aperture-iris diaphragm, a removable front lens and an auxiliary lens which can be switched in for illuminating larger object fields.

BACKGROUND OF THE INVENTION

On microscopes, objectives having very different magnifications are often used sequentially and are quickly exchanged one with the other. The object fields corresponding to the objectives thereby vary very intensely in their magnitude and it is difficult to illuminate these different object fields uniformly well. It is practically impossible to illuminate object fields of objectives having a very high magnification of such as 100X as well as the object fields of scanning objectives with only a small magnification such as 1.25X with one individual condenser.

Two different condensors are often utilized for the above-mentioned extreme cases. U.S. Pat. No. 3,930,712 discloses a sub-stage illuminating device which includes two complete mutually exchangeable condensors disposed on a rotatable turret. In addition, a second rotatable turret is provided which enables contrasting elements to be pivoted into the illuminating beam path.

Such multi-condensors are very complex and expensive and require a great deal of space beneath the stage of the transmitted-light microscope equipped therewith.

Condensers are also known wherein the front lens for illuminating larger object fields can be removed, for example, by flipping them out or an auxiliary lens is additionally switched into the illuminating beam path beneath the aperture diaphragm. Such condensors are disclosed, for example, in British Pat. No. 1,423,691 and U.S. Pat. No. 4,521,076.

However, with one of these two measures alone, the entire region of object fields of different sizes for objectives having magnifications of 100X and 1.25X cannot be covered.

U.S. Pat. Nos. 3,799,645; 3,833,283; and, 4,136,927 disclose how the two above-mentioned measures can be combined with each other, namely the removal of the front lens and the switching in of the auxiliary lens. However, the auxiliary lens is here at a position far beneath the aperture-diaphragm plane so that the condenser must be of relatively long configuration and requires much space. In addition, when the auxiliary lens or also contrasting elements such as annular diaphragms for phase contrast are pivoted into the illuminating beam path, one must be certain that the aperture-iris diaphragm, which is stationary in the known condensors, is fully opened. If the danger of erroneous operations is to be avoided, additional constructive measures must be taken in order that the aperture diaphragm is opened automatically in specific switching positions. In this connection, reference may be made to the above-mentioned U.S. Pat. Nos. 4,521,076 as well as 4,368,947.

SUMMARY OF THE INVENTION

It is an object of the invention to provide a universal condenser for a microscope for illuminating smaller and very large object fields which has the simplest possible configuration and is convenient to operate.

The universal condenser of the invention includes a controllable aperture-iris diaphragm, a removable front lens, and an auxiliary lens which can be switched in for illuminating large object fields. According to a feature of invention, the aperture-iris diaphragm and the auxiliary lens are mounted on switching positions of a common turret and are switchable alternatively into the illuminating beam path.

The turret can have further switching positions which can be fitted with contrasting elements such as phase rings which are conventional in microscopy.

The invention has its inception in the consideration that the controllable aperture-iris diaphragm is essentially needed only for making observations with mid and higher magnifications. The aperture-iris diaphragm is not required for illuminating object fields of scanning objectives with very low imaging magnification. The entire condenser can be built to be very compact since the aperture-iris diaphragm can be alternately exchanged with the auxiliary lens. It is then necessary to have only a single turret disc which, in addition, can be mounted very closely beneath the optical elements of the condenser. Finally, the danger is prevented that the aperture-iris diaphragm inadvertently remains in the closed position when working with contrasting methods or when the auxiliary lens is switched into position since the aperture-iris diaphragm is located in common with the auxiliary lens on a single turret and can only reach the beam path in one position.

BRIEF DESCRIPTION OF THE DRAWINGS

The invention will now be described with reference to the drawing wherein.

DESCRIPTION OF THE PREFERRED EMBODIMENTS OF THE INVENTION

Figure 1:
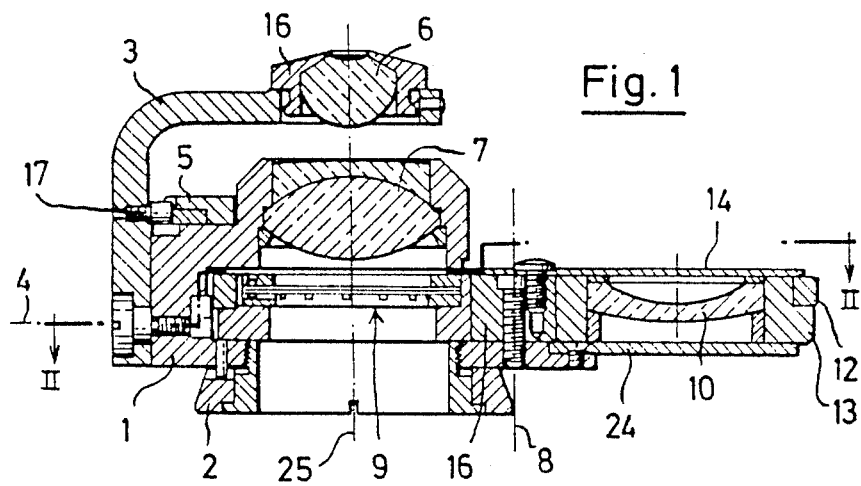
FIG. 1 shows a preferred embodiment of the condenser according to the invention wherein the view is in section and taken along the optical axis; and, FIG. 2 is a section view of the condenser of FIG. 1 taken along line II—II.

The condenser shown in FIG. 1 is an achromatic-aplanatic system having an aperture of 0.9 and comprising two lens members, a concave-convex front lens 6 and a biconvex composite lens 7. The composite lens 7 is seated in the mount 1 having an attachment dovetail 2. With the dovetail 2, the entire condenser is mounted in a corresponding seat formed on a microscope. With the aid of the dovetail, the universal condenser can be centered with respect to the beam path of the microscope when the condenser is mounted on the microscope.

A bracket 3 is attached to the mount 1 of the composite lens 7 so as to pivot about an axis 4 perpendicular to the optical axis of the condenser. The bracket 3 supports the mount 16 of the front lens 6 and is provided with a pin 17 which lies against a stop 5 on the fitting 1 for the position shown.

Beneath the composite lens 7, a turret disc 13 is mounted for rotation about a pivot hub 16 mounted on the fitting 1 with the aid of threaded fasteners. The pivot hub 16 defines a pivot axis 8 extending parallel to the optical axis 25 of the condenser. The turret disc 13 has four switching positions of which two are visible in the section view of FIG. 1. One of the two visible switching positions is fitted with an aperture-iris diaphragm 9. The other switching position accommodates an auxiliary lens in the form of a concave-convex negative member 10. Two phase rings having different diameters are accommodated in the two switching positions not seen here in the drawing. The switching positions are provided above and below with cover plates 14 and 24 in the region outside the mount 1 of the composite lens 7.

The turret disc is further provided with indexing means for the four possible switching positions. The indexing means can be in the form of notches provided on the turret disc 13 and engageable by a resiliently-biased roller 15 attached to the mount 1.

Figure 2:
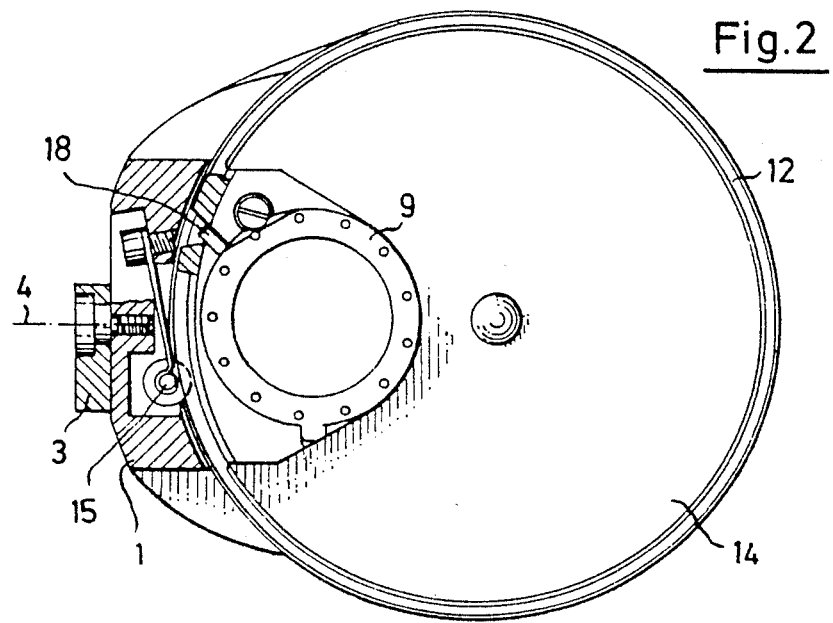

The aperture-iris diaphragm 9 can be adjusted with the aid of a knurled ring 12 mounted on the periphery of the turret disc 13. For this purpose and as shown in the section view of FIG. 2, the actuating lever 18 of the aperture-iris diaphragm 9 engages a V-shaped catch in the knurled ring 12.

In FIG. 1, the front optic and the aperture-iris diaphragm are switched into position. In this position, Köhler illuminating conditions for objectives can be adjusted with a magnification between 5X and 100X. If one operates with phase contrast in this range, the turret disc 13 is then rotated and one of the two available phase rings is switched into position beneath the composite lens 7. An iris which is possibly closed does not here constitute a disturbance since with this step, the aperture-iris diaphragm is removed entirely and simultaneously from the beam path.

The front lens 16 is pivoted out in the event that objectives with smaller imaging magnifications and therefore larger objective fields are to be illuminated. With this measure alone, a virtual Köhler illumination for the objectives with an imaging magnification of 2.5X is possible.

For illuminating still larger objective fields, that is for the work with objectives having an imaging magnification of 1.25X, the auxiliary lens 10 is additionally switched into the beam path beneath the composite lens 7 in the immediate vicinity of the aperture diaphragm 9 which is then pivoted out.

The utilization of the condenser described herein makes it possible with a single turret disc to not only cover the entire enlargement range of a microscope objective between 1.25X and 100X, in addition, the utilization of the above-described condenser also makes possible additional contrasting methods. Operating with this condenser is especially simple, since the work is conducted with a minimum of actuating elements.

It is understood that the foregoing description is that of the preferred embodiments of the invention and that various changes and modifications may be made thereto without departing from the spirit and scope of the invention as defined in the appended claim.

What is claimed is:

1. A universal condenser for a microscope defining an illuminating beam path, the universal condenser comprising:
   a mounting structure defining an optical axis;
   interface means formed on said mounting structure to permit attachment of the universal condenser to the microscope in such a manner that said optical axis is coincident with said beam path;
   only a single turret rotatably mounted on said mounting structure for rotation about a rotational axis;
   a first member consisting only of a controllable aperture-iris diaphragm member;
   an auxiliary lens member for illuminating a large object field corresponding to an objective contained in the microscope;
   at least one contrasting member;
   said single turret having a plurality of switching positions formed thereon for receiving respective ones of said members therein;
   said switching positions being arranged on said single turret so as to be spaced from each other an angular distance to ensure that only one of said members is switchable into the beam path at any given time when said turret is rotated about said rotational axis thereof while the other ones of said members are held out of said beam path;
   a front lens; and,
   mounting means disposed on said mounting structure for holding said front lens in said beam path.

2. The universal condenser of claim 1, said turret having additional switching positions; and, said condenser further comprising a further number of said contrasting members disposed in corresponding ones of said additional switching positions.

3. The universal condenser of claim 1, said diaphragm member defining a diaphragm plane; and, said auxiliary lens being a negative lens mounted in said turret so as to be in the immediate vicinity of said diaphragm plane when switched into said beam path.

4. The universal condenser of claim 1, said mounting means including means for moving said front lens between a first position whereat said front lens in said beam path and a second position whereat said front lens in out of said beam path.

5. The universal condenser of claim 2, said mounting means including means for moving said front lens between a first position whereat said front lens in said beam path and a second position whereat said front lens in out of said beam path.

6. The universal condenser of claim 3, said mounting means including means for moving said front lens between a first position whereat said front lens in in said beam path and a second position whereat said front lens in out of said beam path.

* * * * *

UNITED STATES PATENT AND TRADEMARK OFFICE
CERTIFICATE OF CORRECTION

PATENT NO. : 4,807,980

DATED : February 28, 1989

INVENTOR(S) : Peter Dietrich and Hanns J. Bendele

It is certified that error appears in the above-identified patent and that said Letters Patent is hereby corrected as shown below:

In column 1, line 8: delete "microscoped" and substitute -- microscope -- therefor.

In column 1, line 24: delete "condensors" and substitute -- condensers -- therefor.

In column 1, line 27: delete "condensors" and substitute -- condensers -- therefor.

In column 1, line 31: delete "condensors" and substitute -- condensers -- therefor.

In column 1, line 39: delete "condensors" and substitute -- condensers -- therefor.

UNITED STATES PATENT AND TRADEMARK OFFICE
CERTIFICATE OF CORRECTION

PATENT NO. : 4,807,980

DATED : February 28, 1989

INVENTOR(S) : Peter Dietrich and Hanns J. Bendele

It is certified that error appears in the above-identified patent and that said Letters Patent is hereby corrected as shown below:

In column 1, line 58: delete "densors" and substitute -- densers -- therefor.

In column 2, line 35: delete "drawing" and substitute -- drawings -- therefor.

In column 3, line 56: delete "claim" and substitute -- claims -- therefor.

In column 4, line 43: insert -- is -- between "lens" and "in".

In column 4, line 45: delete "in" and substitute -- is -- therefor.

UNITED STATES PATENT AND TRADEMARK OFFICE
CERTIFICATE OF CORRECTION

PATENT NO. : 4,807,980

DATED : February 28, 1989

INVENTOR(S) : Peter Dietrich and Hanns J. Bendele

It is certified that error appears in the above-identified patent and that said Letters Patent is hereby corrected as shown below:

In column 4, line 48: insert -- is -- between "lens" and "in".

In column 4, line 50: delete "in" and substitute -- is -- therefor.

In column 4, line 53: delete "in", first occurence and substitute -- is -- therefor.

In column 4, line 55: delete "in" and substitute -- is -- therefor.

Signed and Sealed this

Twenty-eighth Day of November 1989

Attest:

JEFFREY M. SAMUELS

*Attesting Officer*     *Acting Commissioner of Patents and Trademarks*